(12) United States Patent
Dell et al.

(10) Patent No.: US 11,756,538 B1
(45) Date of Patent: Sep. 12, 2023

(54) LOWER LATENCY SPEECH PROCESSING

(71) Applicant: Amazon Technologies, Inc., Seattle, WA (US)

(72) Inventors: Carl Joshua Dell, Seattle, WA (US); Timothy Kay Cheng, Bellevue, WA (US); Scott G. LeBaron, Edmonds, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 878 days.

(21) Appl. No.: 16/709,651

(22) Filed: Dec. 10, 2019

(51) Int. Cl.
| | |
|---|---|
| *G10L 15/00* | (2013.01) |
| *G10L 15/22* | (2006.01) |
| *G10L 15/02* | (2006.01) |
| *G10L 15/18* | (2013.01) |
| *G10L 15/30* | (2013.01) |
| *G10L 15/065* | (2013.01) |
| *G10L 25/30* | (2013.01) |
| *G10L 15/183* | (2013.01) |
| *G10L 15/16* | (2006.01) |

(52) U.S. Cl.
CPC ............... *G10L 15/22* (2013.01); *G10L 15/02* (2013.01); *G10L 15/065* (2013.01); *G10L 15/1815* (2013.01); *G10L 15/30* (2013.01); *G10L 15/16* (2013.01); *G10L 15/1822* (2013.01); *G10L 15/183* (2013.01); *G10L 25/30* (2013.01); *G10L 2015/223* (2013.01)

(58) Field of Classification Search
CPC .......... G10L 15/07; G10L 15/20; G10L 15/22; G10L 15/26; G10L 15/30; G10L 15/02; G10L 15/063; G10L 15/16; G10L 25/30; G10L 15/08; G10L 15/1822; G10L 15/183; G10L 15/19; G10L 15/193; G10L 25/87; G10L 25/78; G10L 19/00; G10L 19/005
See application file for complete search history.

(56) References Cited

U.S. PATENT DOCUMENTS

| | | | | |
|---|---|---|---|---|
| 11,232,262 | B2* | 1/2022 | Bagley, Jr. et al. | G05B 19/0423 |
| 11,423,235 | B2* | 8/2022 | Huang et al. ......... | G06F 40/35 |

* cited by examiner

*Primary Examiner* — Vu B Hang
(74) *Attorney, Agent, or Firm* — K&L Gates LLP

(57) ABSTRACT

Devices and techniques are generally described for pre-caching of speech processing feature data. In various examples, first data indicating source data is received from a first speech processing component. The source data may be used to generate first feature data. In various examples, a first request to process first input data is received. A second speech processing component may generate the source data during processing of the first input data. The first feature data may be generated using the source data. The first feature data may be sent to the first speech processing component. In some examples, the first speech processing component may store the first feature data in a first cache local to the first speech processing component.

20 Claims, 9 Drawing Sheets

LOWER LATENCY SPEECH PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
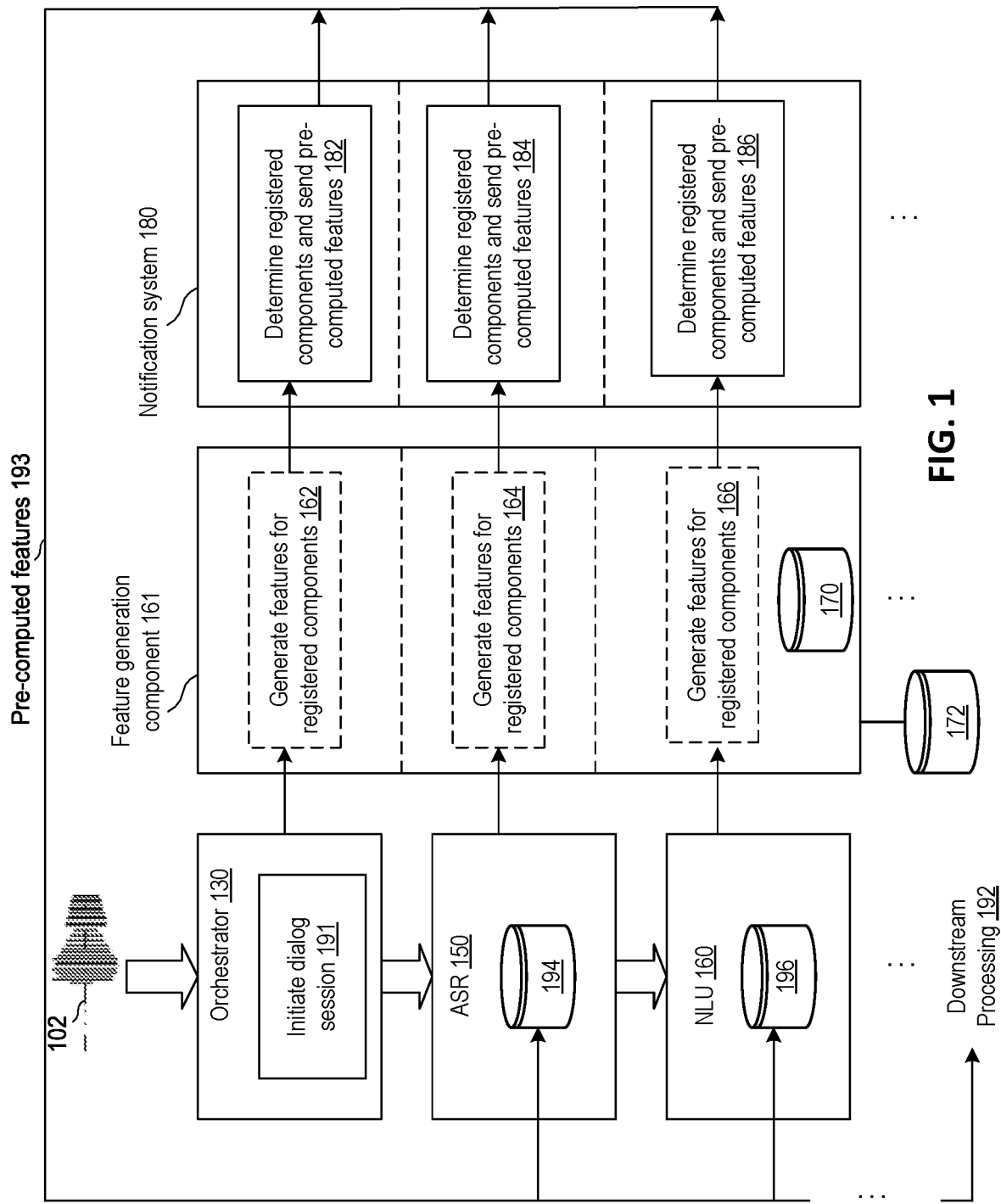
FIG. 1 is a block diagram illustrating an example of pre-fetching and caching of speech processing feature data, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance. As used herein, user utterances, input text data, and/or any form of requests input to a speech processing system may be described by "request data" and/or "user request data." Such request data may change forms many times during processing of the request data by various components of the speech processing system, as described in further detail below. For example, initially the request data may be audio data and/or input text data representing a user question. The audio data may be transformed into text data and/or other ASR output data by an ASR component of the speech processing system. The text data may be transformed into intent data by an NLU component of the speech processing system. The intent data may be used by a speech processing skill and/or speech processing application to perform an action. "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software. Similarly, "skills," as used herein, may refer to any types of speech processing applications.

Various components of speech processing systems may employ machine learning models in order to determine interpretations of a given natural language input and/or to decide one or more actions to take in response to a natural language input. For example, NLU may use one or more statistical machine learning models to determine an interpretation of text data (and/or other ASR output data) representing the utterance received from ASR. NLU may generate a list of n-best hypotheses, where each hypothesis includes an identification of a speech processing application (e.g., a skill) for processing the current request data along with data representing an interpretation of the request data for that skill. In various further examples, the hypotheses may include context data such as a device identifier, identifying the device at which the request data was received, timing data, user identification data, etc. Various speech processing components that are downstream of NLU (e.g., speech processing components that process request data following NLU processing) may use the hypothesis data generated by NLU as inputs to machine learning models in order to perform various functions of the speech processing system. For example, a ranking component may use feature data computing using at least some of the NLU hypothesis data as an input to a machine learning model of the ranking component. The output of the ranking component's machine learning model may be a ranked list of the hypotheses.

However, retrieving the NLU data at the time that the ranking component is called on to rank the hypotheses and computing the corresponding input feature data from the NLU data may introduce latency into the speech processing system. Accordingly, described herein are various systems and techniques that may be used to pre-compute and cache various feature data prior to use of such feature data by downstream speech processing components. Further, in at least some examples, the feature data is sent to the downstream speech processing components that use such data for local caching in order to further reduce latency. Furthermore, redundant feature data may be stored in one or more other caches apart from the caches of the machine learning models that use the feature data as inputs, due to possible size constraints associated with local caching. Local caches refer to caches that are located on the same physical machine (e.g., computing device(s)) as a component to which the caches are local. For example, a local cache to an NLU component may be a cache located on the same physical machine(s) where the NLU component is executing. By contrast, distributed caches may be located on remote devices that may be accessible over a network (e.g., a wide area network and/or a local area network). Distributed caches may be accessed by making a network call to the appropriate network address and/or port of the remote devices.

Such pre-computed and cached feature data may be used as inputs into machine learning models. Generally, in machine learned models, such as neural networks, parameters (along with the input feature data) control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

In various examples, speech processing systems may determine an action to take for processing request data according to an interpretation of the utterance determined by NLU. For example, a particular speech processing application — sometimes referred to as a "skill" when the application is executed by a system located physically remote from the user's device or otherwise interfaces with a speech processing system — may be selected to process request data based on a determination that the request data pertains to the particular skill. For example, a skill may be selected to process request data based on one or more intents and/or named entities determined during NLU processing of the request data. In another example, a speech processing system may determine an application that may generate a response to a user utterance that may be output via a TTS component (e.g., TTS component 201 of FIG. 2) of the speech processing system. Selection of the appropriate action and/or the appropriate speech processing component used to take the action and/or process the request data is non-trivial. Accordingly, machine learning models may be used to select an appropriate skill and/or action for particular request data. In various examples, such machine learning models may use feature data as inputs that are generated by upstream speech processing components. As used herein, "upstream" refers to speech processing components that perform processing prior to the relevant speech processing component, while "downstream" refers to speech processing components that perform processing after the relevant speech processing component. Described herein is a pre-fetching and caching system that may be used to compute and cache feature data for downstream speech processing components prior to the time at which the downstream speech processing components use such feature data. Pre-computing and caching such feature data may reduce overall speech processing latency and may result in a more responsive speech processing experience.

The speech processing routing system may facilitate the sending of request data to appropriate speech processing application and/or other speech processing components. In various examples, the speech processing routing system may use machine learning models trained using features computed using user feedback data, context data, and/or other predictive signals in order to determine the appropriate speech processing application and/or other speech processing component to process current request data. In various examples, using machine learning models to dynamically learn routing may improve the accuracy of the routing of speech processing requests, resulting in improved user experiences and/or more pertinent responses to user request data. For example, a machine learning system may dynamically learn from contextual data and/or user feedback data to provide routing exceptions and/or routing flexibility, in contrast to a deterministic routing system.

In an example embodiment, a feature generation component may receive a list of features that are used as inputs to various machine learning models of the speech processing system. Features may include vectors, tensors, and/or other structured data that may be used as an input to a machine learning model in order to generate a prediction (e.g., a speech processing routing prediction for request data). For example, the NLU system may use one or more machine learning models to determine a semantic interpretation of request data representing a user utterance. The NLU system may use various features as input. For example, the NLU system may use a feature representing text data representing the utterance, a feature representing context data describing a context of the utterance (e.g., geographic location of the device at which the utterance was received, time of day, device identifier, and so on), etc. In another example, the NLU system may use a feature representing user feedback data indicating user feedback related to similar utterances. In various examples, at least some of the features used by the NLU system may be pre-computed prior to the processing of the request data representing the utterance, while other features used by the NLU system may be computing during NLU processing, in an on-demand fashion. For example, the text data representing the utterance may be computed in response to receipt of the request data (e.g., during processing of the request), while a feature indicating user feedback over the past three days for similar utterances may be pre-computed by the feature generation component prior to receipt of request data. Features that are pre-computed by the feature generation component may be defined and specified to the feature generation component prior to online processing of request data. Additionally, as described herein, the pre-computed features generated by the feature generation component may be cached so that such features are available when the relevant downstream speech processing component is ready to use the features for prediction.

Accordingly, the feature generation component may generate pre-computed features according to definition data specified prior to online speech processing execution. The definition data may define features to be precomputed and may include identification of source data used to calculate the feature. Speech processing components may send the definition data during a registration process at which the speech processing components register with the feature generation component. In at least some examples, the definition data may include functions and/or formula used to calculate the features from the source data. In various examples, the feature definition data may be supplied to the feature generation component via an application programming interface (API). In other examples, speech processing components may determine the feature definition data and may send the feature definition data to the feature generation component. For example, a skill shortlister component may specify a feature that is to be pre-computed and made available for use by one or more machine learning models of the skill shortlister. The one or more machine learning models of the skill shortlister may use the feature as an input, and may determine a subset of possible skills for processing given request data as an output. For example, the skill shortlister may specify that user feedback data from the past day and context data from the past 2 hours are to be used to calculate the feature. The skill shortlister may further define a manner in which the feature is to be calculated using the user feedback data and the context data. For example, the skill shortlister may supply data representing a formula used to calculate the feature. The formula may use a numerical representation of the user feedback data and a numerical representation of the context data to generate a vector representation of the feature. In at least some examples, upstream speech processing components may send data directly to downstream speech processing components without using a feature generation component. For example, upstream speech processing components may push (or otherwise send) data to downstream components that may be used as feature data and/or may be used to compute feature data.

It should be appreciated that the foregoing example is illustrative only. In general, features may be pre-computed by the feature generation component (or other speech processing component) for any machine learning models used by the speech processing system. The features may be pre-computed according to feature definitions supplied to the feature generation component (or other speech processing component) during registration, prior to processing of request data (e.g., prior to runtime).

Upon pre-computing a particular feature, the feature generation component may store the feature data in a local cache (e.g., a cache located within the same physical machine(s) where the feature generation component is located and/or executing, such as an L1 and/or L2 cache) and/or a distributed cache (a memory on a remote machine accessible by the feature generation component over a network). Additionally, the feature generation component may send data indicating that the feature has been pre-computed to a notification system. The notification system may, in turn, notify any speech processing components that have registered for the pertinent feature that the feature has been computed. Accordingly, a registered, downstream speech processing component may receive a notification that a feature used by a machine learning model of the downstream speech processing component has been generated. The notification system, the feature generation component, and/or some other component may send the feature data to the relevant downstream speech processing component. The downstream speech processing component may store the feature data in a cache local to the speech processing component. Later, when the speech processing component is called by an orchestrator or other component of the speech processing system to perform its function, the speech processing component may retrieve the feature data from its local cache. The feature data may be input into a machine learning model(s) of the speech processing component in order to generate output. If the feature data in the local cache has been overwritten, corrupted, or is otherwise unavailable, the speech processing component may send a request to the feature generation component to retrieve the feature data from either the feature generation component's local cache and/or a distributed cache of the feature generation component. If the feature data is not available in any of the relevant caches, the feature generation component may re-compute the feature data (and/or may lookup the relevant feature data from the relevant data sources).

Caching the pre-computed features in multiple locations may further reduce latency as the speech processing components that consume the features may first attempt to retrieve the features from the local cache, followed by the feature generation component's local cache, followed by the feature generation component's distributed cache.

The feature generation component may communicate with one or more data sources to obtain the data used to compute the features according to the feature definitions. For example, the feature generation component may communicate with a context system that provides context data related to past speech processing interactions (e.g., location data, device identifier data, timing data, user account data, etc.). In another example, the feature generation component may communicate with NLU to determine data resulting from NLU processing of request data (e.g., NLU hypothesis data including intent data, slot data, skill identifier data, etc.). In another example, the feature generation component may communicate with a user feedback component that provides indications of past implied and/or explicit user feedback resulting from past user interactions with the speech processing systems (e.g., based on a past experience with a skill). In another example, the feature generation component may communicate with a component that provides skill data related to past processing of request data by a particular skill (e.g., whether or not a skill was able to successfully process past request data, etc.). In general, the feature generation component may be configured in communication with any applicable data source that may be used to precompute features for machine learning models of the speech processing system.

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to request data representing user utterances by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be request data in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

FIG. 1 is a block diagram illustrating an example of pre-fetching and caching of speech processing feature data, according to various embodiments of the present disclosure.

Audio data 102 may be audio data representing a spoken user utterance (e.g., a user request and/or command) for processing by a speech processing system. In the example depicted in FIG. 1, the audio data 102 may be received by an orchestrator 130 of a speech processing system. Upon receipt of the audio data 102, the orchestrator 130 may initiate a dialog session 191. In various examples, initiation of the dialog session may include determining various contextual data concerning the audio data 102. For example, metadata may be included with the audio data 102 indicating a time at which the audio data was received, a device identifier identifying a speech processing-enabled device at which the request was received, a user ID identifying a user that spoke the request, an IP address, geolocation data, etc.

Feature generation component 161 may be a computer-implemented system effective to generate feature data according to definitions supplied by one or more other speech processing components. In various examples, speech processing components may register with feature generation component 161. During registration, a speech processing component may specify feature data used by one or more machine learning models of that speech processing component for prediction during request data processing. In order to specify the feature data used by a particular speech processing component, the speech processing component may send feature definition data to the feature generation component 161. The feature definition data may identify source data that may be used to generate the relevant feature. In some cases, the source data may be data that is generated by other speech processing components during normal speech processing operations (e.g., data generated as a result of ASR processing, NLU processing, etc.).

For example, a ranking component 120 (described below in reference to FIG. 2) may use data generated by an NLU component of the speech processing system to generate feature data for machine learning models of the ranking component 120. Accordingly, the NLU data may be source data used to generate the feature according to the feature definition for the ranking component 120. Accordingly, during registration, the ranking component 120 may specify feature definition data that specifies the relevant NLU data as source data. For example, the ranking component may specify NLU hypothesis data (including a skill identifier and an intent for the identified skill) as source data that may be used to generate a feature for a machine learning model of the ranking component 120. In this example, NLU processing may occur prior to processing by the ranking component 120, during the processing of request data. In other words, the processing by the ranking component 120 may be downstream of the NLU processing in the speech processing system.

At action 162 of FIG. 1, the orchestrator 130 may send a signal to feature generation component 161 to inform feature generation component 161 that dialog session 191 has been initiated. In response, feature generation component 161 may determine whether any speech processing components have registered with feature definitions that use data that is available after orchestrator 130 initiates a dialog session. For example, a speech processing component may register with feature generation component 161 and specify a feature using a device identifier (e.g., a device ID from which a speech processing request was received) as source data. Since the device identifier data may be determined by orchestrator 130 during the initiation of the dialog session at action 191, feature generation component 161 may determine that the feature may be computed. Accordingly, at action 162, feature generation component 161 may generate feature data for the registered speech processing component according to the feature definition using the device ID as the source data.

In another example, ASR component 150 may register with feature generation component. ASR component 150 may send a feature definition that indicates that a user ID and a device ID (e.g., the source data) should be concatenated together, for example, to generate the feature used by a machine learning model of the ASR component 150. Later, orchestrator 130 may receive audio data 102. Orchestrator 130 may initiate dialog session 191 and may determine a user ID and a device ID (potentially among other metadata) associated with the audio data 102 during the initiation of the dialog session 191. Orchestrator 130 may send a signal to feature generation component 161 indicating that a dialog session 191 has been initiated. Feature generation component 161 may determine that the source data for the feature definition registered by the ASR component 150 is available. Accordingly, in an embodiment, the feature generation component 161 queries the orchestrator 130 for the user ID and the device ID. In another example embodiment, the orchestrator 130 may send the user ID and the device ID to the feature generation component 161 upon initiation of the dialog session 191.

At action 164 the feature generation component 161 may generate feature data for ASR component 150 by concatenating the user ID and the device ID (e.g., the source data) according to the feature definition provided by the ASR component 150 during registration. Thereafter, feature generation component 161 may store the feature data in a local cache 170 (e.g., a cache (or caches) located on the same physical machine(s) as feature generation component 161, such as an L1 and/or L2 cache) and/or in a distributed cache 172. Distributed cache 172 may be located on a remote device that may be accessible by feature generation component 161 and/or by other speech processing components (e.g., by ASR component 150, etc.) via a network. Feature generation component 161 may send the feature data to notification system 180. Notification system 180 may determine the registered components and may send the pre-computed features 182 to the registered components that have registered for the particular feature.

In the current example, ASR component 150 has registered for the pre-computed feature 193 that comprises the user ID concatenated with the device ID. Accordingly, the pre-computed features 193 may be sent to ASR component 150. ASR component 150 may store the pre-computed features 193 in a local cache 194 that is local to the ASR component 150 (e.g., a cache (or caches) that is located on the same physical machine(s) as the ASR component 150, such as an L1 and/or L2 cache). The features are referred to as "pre-computed" because they may be computed prior to the time at which they are used by the speech processing component for which they have been computed. Similarly, when the speech processing component caches the feature data locally, such caching may be referred to as "pre-caching" since the features may not yet be needed until that particular speech processing component is called to perform its speech processing function.

ASR component 150 may be sent the audio data 102 by the orchestrator 130. In an example, ASR component 150 may use the feature data generated at action 162 as one of the inputs to a machine learning model that may be used to generate text data from the audio data 102. ASR component 150 may first search local cache 194 for the feature data. The cache may be implemented as a block of memory for temporary storage of data likely to be used again (such as the feature data generated by feature generation component 161). A cache may be made up of a number of entries. Each entry may have associated data (e.g., feature data generated by feature generation component 161), which may be a copy of data that is also located in some backing store of memory. Each entry in the cache is associated with a tag that specifies the identity of the data in the backing store of memory. When a client of the cache (e.g., ASR component 150 in the current example) requests access to data presumed to exist in the backing store, the cache may first be searched using the tag as a search query. If an entry can be found with a tag matching that of the desired data, the data in cache entry is used instead (e.g., a cache "hit") of searching the slower, backing memory. Conversely, if no entry is found with a tag matching the tag of the search query, a cache "miss" is experienced, and the feature data is retrieved from another source and/or is computed on-demand, as described herein.

If the feature data is located in local cache 194 (e.g., a cache hit), ASR component 150 may use the feature data as an input to the machine learning model for prediction of the text data corresponding to the audio data 102. If ASR component 150 experiences a cache miss (e.g., the feature data has been overwritten, corrupted, and/or not stored), ASR component 150 may send a request to feature generation component 161 for the feature data. Feature generation component 161 may search local cache 170 for the feature data. If the feature data is located in local cache 170, feature generation component 161 may send the feature data to ASR component 150 and ASR component 150 may use the feature data as an input to the machine learning model for prediction of the text data corresponding to the audio data 102.

If feature generation component 161 experiences a cache miss when searching local cache 170, feature generation component 161 may generate a network request to search distributed cache 172 for the feature data. Again, if the feature data is returned from the distributed cache the feature data may be sent to ASR component 150. However, if the feature data is not found in the distributed cache 172, feature generation component 161 may again generate another instance of the feature data according to the feature definition. In at least some examples, generation of the feature data according to the feature definition may comprise looking up the source data indicated in the feature definition. The feature generation component 161 may send the feature data to ASR component 150 for processing.

In various examples, if the ASR component 150 is able to retrieve the feature data from the local cache 194 there may be a minimal impact on overall latency to the speech processing system. Additionally, retrieving the feature data from the local cache 170 of feature generation component 161 may offer improvements in latency relative to retrieving the feature data from distributed cache 172 or generating the feature data on-demand upon ASR component 150 receiving the instruction from orchestrator 130 to process the audio data 102. Similarly, retrieving the feature data from distributed cache 172, while introducing more latency relative to retrieving the feature data from local caches 194 or 170, may offer reduced latency relative to on-demand feature generation, as described above. Retrieving the feature data from local caches (e.g., local caches 194, 170) may incur the smallest amount of latency as these caches are local to the device performing the cache search. By contrast, searching remote caches, such as distributed cache 172, may require a network call that may require that a cache search request be transmitted over a network to a remote device including the cache. Additionally, the data may be sent back over the network to the requesting device, incurring additional latency.

Various other examples of pre-computing and pre-caching speech processing feature data are illustrated in FIG. 1. For example, after ASR component 150 generates text data representing the audio data 102, various data generated by the ASR component 150 may be source data that may be used to precompute feature data for other downstream speech processing components (e.g., at action 166, etc.). Accordingly, after completion of ASR processing, feature generation component 161 may generate features for registered components (e.g., components that use feature data computed using ASR output). The feature data may be stored in local cache 170 and distributed cache 172 and may be sent to notification system 180. Notification system 180 may send the feature data (184) to those speech processing components that have registered for the features. For example, NLU component 160 (and/or some other downstream processing 192 component) may have registered for feature data comprising text data generated using ASR processing. Accordingly, the feature data may be sent by notification system 180 to these speech processing components and may be cached locally by these speech processing components (e.g., in cache 196 local to NLU component 160). Note that actions 162, 164, and 166 are depicted in dashed lines in FIG. 1 to illustrate that these are actions performed by the feature generation component 161 at various points in time as processing of request data by various components of the speech processing system 100 progresses.

Similarly, feature generation component 161 may generate feature data using NLU output data. The feature data may be sent by notification system 180 to speech processing components that have registered for the feature data at action 186. For example, a ranking component 120 used to generate a ranked list of speech processing skills used to process request data (e.g., utterance data representing an utterance) may receive feature data that is pre-computed using NLU output data. The ranking component 120 may cache the feature data in a local cache until it is time for the ranking component 120 to generate a ranked list using a machine learning model.

In an example, three different downstream speech processing components may have registered with feature generation component 161 for feature data that can be computed using source data available after orchestrator 130 has initiated dialog session 191. The feature data and the source data for each feature definition may be different (or the same) for each of the three different downstream speech processing components. For example, speech processing component 1 may specify feature definition A, speech processing component 2 may specify feature definition B, and speech processing component 3 may specify feature definition C. Feature generation component 161 may generate feature data A, B, and C, according to the feature definitions A, B, and C, for each of the three registered speech processing components 1, 2, and 3. Feature generation component 161 may send the feature data A, B, and C to notification system 180. Notification system 180 may determine the downstream speech processing components that have registered for the respective features and may send the feature data A to speech processing component 1, feature data B to speech processing component 2, and feature data C to speech processing component 3. In at least some examples, feature generation component 161 may prioritize computation of various features based on order in which the registered speech processing components will use the feature data. For example, if speech processing component 3 is the most upstream speech processing component relative to speech processing components 1 and 2, feature generation component 161 may generate the feature data C prior to generation of feature data A and B. This may be done so that the feature data C may be cached in time for use by speech processing component 3.

Further, in some examples, pre-computed features 193 may be cached by upstream speech processing components. For example, in a multi-turn dialog session, upstream speech processing components may cache pre-computed features 193 and use the pre-computed features 193 as inputs to machine learning models in order to perform the functions of the speech processing components during the next turn of dialog. A turn may comprise a user request (e.g., an utterance) followed by the speech processing system generating an output (e.g., TTS output and/or taking some action in response to the user request). In some examples, a speech processing component may overwrite feature data stored in a local cache with updated feature data when new source data is available (e.g., during a subsequent dialog turn), so that the latest feature data is available for the speech processing component.

Figure 2:
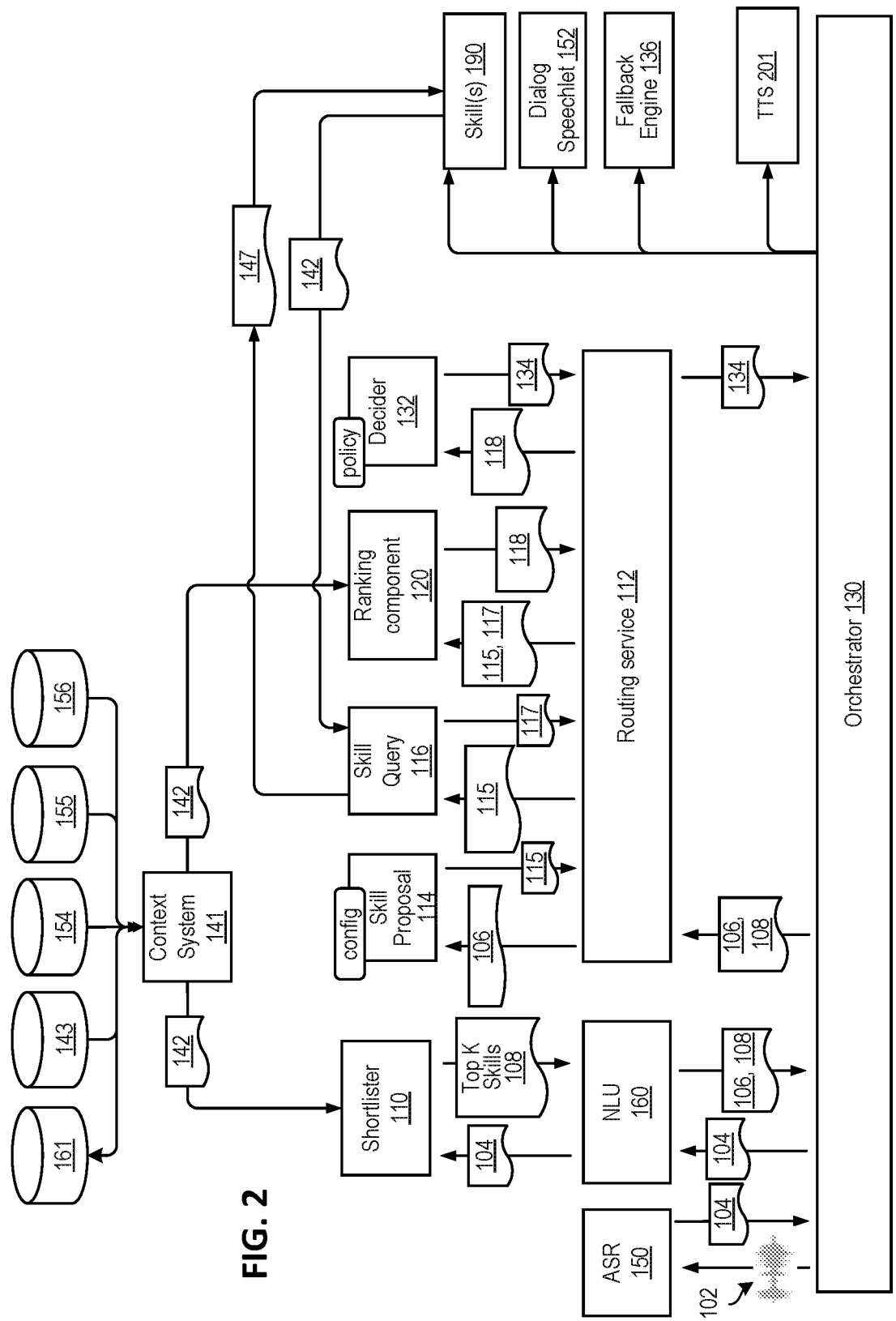
FIG. 2 is a block diagram illustrating an example speech processing routing system, according to various embodiments of the present disclosure.

FIG. 2 is a block diagram illustrating an example speech processing routing system, according to various embodiments of the present disclosure. FIG. 2 describes functionality of various speech processing components of a speech processing system 100 during processing of request data. A system according to the present disclosure may operate using various components as described in FIG. 2. The various components illustrated in FIGS. 1-2 may be located on the same or different physical devices. Communication between various components illustrated in FIGS. 1-2 may occur directly or across a network. A speech processing-enabled device may capture audio using an audio capture component, such as one or more microphone(s). The speech processing enabled device may send audio data 102 (e.g., corresponding to an utterance) to an orchestrator 130 of the speech processing system 100. The speech processing enabled device may also send metadata (e.g., including device identifiers, device type data, contextual data, IP address data, room location data, etc.) to the orchestrator 130. The components depicted in FIG. 1, including components of a speech processing system may be generally referred to as spoken language processing components, a speech processing system 100 a spoken language processing system, speech processing components, and/or a speech processing routing system. Additionally, in various examples, the components depicted in FIG. 2 may process written input (e.g., text data) in addition to spoken input.

Upon receipt by the speech processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more text hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 generated thereby to orchestrator 130 that may, in turn, send the text data 104 to NLU component 160. As previously described, the text data 104 may include one or more ASR hypotheses. The text data 104 may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the speech processing system 100) may generate other metadata associated with the utterance such as an overall utterance confidence score, per-word (e.g., per token) confidence scores for the request data, utterance duration, stream duration (e.g., duration of the stream of audio data from speech processing enabled device to speech processing system 100), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 104 based on individual words represented in the text data 104. The NLU component 160 interprets a text string to derive an intent of the user (e.g., an action that the user desires be performed) as well as pertinent pieces of information in the text data that allow a device (e.g., the speech processing enabled device, the speech processing system 100, a computing device(s) implementing a skill, etc.) to complete the intent. For example, if the text data 104 corresponds to "Set temperature to 74 degrees," the NLU component 160 may determine the user intended to invoke a climate intent with a target temperature value slot of 74° F. As previously described, in addition to the NLU intent and slot data, the NLU component 160 may generate other metadata associated with the request data (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 160 (depicted in FIG. 1 as NLU 160) is referred to as NLU output data 106.

NLU component 160 may send the text data 104 and/or some of NLU output data 106 (such as intents, recognized entity names, slot values, etc.) to a shortlister 110. The shortlister 110 may comprise one or more machine learning models that may be effective to predict a subset of skills that are most likely to be able to correctly process the request data, based on the input of the text data 104 and/or the NLU output data 106. In some examples, the shortlister 110 may pre-cache feature data used by the machine learning models of the shortlister 110 by providing feature definition data defining the features to feature generation component 161. Feature generation component 161 may compute the features using the source data when such source data is available and may send the pre-computed features to shortlister 110. Shortlister 110 may store the features in a local cache and may retrieve the features as needed during processing, as described above in reference to FIG. 1. Additionally, copies of the features may be stored in a cache of feature generation component 161 and/or in a distributed cache. As previously described, the shortlister 110 may define source data used to compute the features during registration with the feature generation component 161. In some examples, the shortlister 110 may specify functions used to generate the features from the source data (e.g., formulae and/or functions) prior to runtime processing of request data. The feature generation component 161 may precompute the features according to the specified feature definitions supplied by shortlister 110 and by the other components of speech processing system 100 and may store the precomputed features in a local cache (e.g., local cache 170), a distributed cache (e.g., distributed cache 172), and/or may send the features to the relevant speech processing component (e.g., shortlister 110) for caching in a local cache of that speech processing component. Feature generation component 161 may cache the feature data generated for shortlister 110 as described above in reference to FIG. 1. Accordingly, during runtime processing, shortlister 110 may retrieve the precomputed features from feature generation component 161 (and/or from a cache local to shortlister 110) and may use the features as input in order to generate the subset of skills that are most likely to be appropriate to process the current request data. Accordingly, shortlister 110 may send the top K skills 108 to NLU component 160. NLU component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses).

Feature generation component 161 may communicate with various systems in order to obtain source data used to precompute features. For example, feature generation component 161 may communicate with feedback storage 143 to receive user feedback data (e.g., explicit and/or implicit user feedback related to user satisfaction with processing of request data). In various examples, the user feedback data may be user-specific and/or device specific and may indicate whether a user was satisfied or not satisfied with a particular interaction with speech processing system 100. Additionally, feature generation component 161 may communicate with context system 154, which may provide context data at the conclusion of a user interaction with the speech processing system 100. In another example, feature generation component 161 may communicate with ASR component 150 and/or NLU component 160 to retrieve data generated during ASR and/or NLU processing. In another example, feature generation component 161 may communicate with skill data 156 to determine information from the skill regarding past interactions with the skill and/or data acquired by the skill. Additionally, feature generation component 161 may communicate with other data sources 155, as new services are added and/or as new data types that may be useful for routing prediction are made available. In some examples, a context system 141 may receive the context data 142. The context system 141 may provide the context data directly to both feature generation component 161 as well as to various components of the routing system of speech processing system 100. For example, the context system 141 may send context data 142 to shortlister 110 and/or ranking component 120 in order to determine a shortlist of skills 190 for particular request data and/or in order to rank the shortlisted skills.

NLU output data 106 and top K skills 108 may be sent by NLU component 160 to orchestrator 130. Orchestrator 130 may send the top K skills 108 and the NLU output data 106 to routing service 112. Routing service 112 may send the top K skills 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190. If so, skill proposal component 114 may generate candidate data comprising <Intent, Skill> candidate pairs 115. The candidate pairs 115 may be sent to routing service 112 and may be sent by routing service 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data. Skill query service 116 may send a signal 117 indicating what skills can fulfill a particular request (and/or what skills are unable to fulfill the request). The signal 117 may be sent to routing service 112. Routing service 112 may send the signal 117 along with the unranked list of candidate pairs 115 to a ranking component 120. As depicted in FIG. 1, skills 190 may send context data 142 to skill query service 116 to indicate situations in which a skill may opt out of processing a particular request (e.g., if the device sending the request data does not include a display screen, etc.). In various examples, the context data 142 sent by skills 190 to skill query service 116 may be skill and/or request specific context data. Additionally, skill query service 116 may send intent requests 147 to skills 190.

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 in order to predict the ranking of the skills 190 included in the candidate pairs 115. The features computing during processing of the request data (sometimes referred to as "runtime features") may comprise a feature representation of the list of candidate pairs 115 and/or a representation of the signal 117. Additionally, ranking component 120 may retrieve pre-cached features generated by feature generation component 161 for precomputed features that have been registered for by ranking component 120. As previously described, the precomputed features may be determined based on contextual data, user feedback data, past usage data, skill data, NLU data, previous rankings of ranking component 120, etc. Additionally, to the extent necessary, ranking component 120 may compute runtime features using context data 142, user feedback data from feedback storage 143, and/or other data sources.

Ranking component 120 may generate a ranked list 118 of the candidate skills indicated in candidate pairs 115. In at least some examples, the ranking component 120 may use a deep neural network as a machine learning model for determining the ranked list 118.

In various examples, a decider engine 132 may receive the ranked list 118 of candidates (including any candidates selected via a dynamic routing adjustment, as described above). In some examples, the decider engine 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, context data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider engine 132 may compare the results of the ranking component 120 to one or more predefined policies that may indicate whether or not request data should be sent to top-ranked result of the ranking component 120 or whether some other action should be taken. For example, if the phrase "Call 911" is interpreted by ASR/NLU as the current utterance, the decider engine may comprise a policy indicating that the ranking component results should be ignored and that the request data should always be passed to an emergency contact skill used to contact emergency services.

In another example, a decider engine may determine a class of the request data. For example, if the request data is classified as belonging to a sensitive class the speech processing system may use a dialogue speechlet and/or TTS to confirm the user's intention prior to routing the request data to the top-ranked result of the ranker component. For example, a user utterance may be a request to "unlock the front door." The top-ranked result of the ranking component may be routing to a skill that controls the lock on the front door. However, requests to unlock doors may be classified by the decider engine 132 as a sensitive request. Accordingly, the receipt of the sensitive request may trigger a confirmation request output by TTS prior to routing the request data to the top-ranked skill. For example, the confirmation request may be "Did you want me to unlock the front door?"

In another example, the decider engine 132 may store policies that may control whether or not explicit user feedback is solicited (e.g., via TTS) after the completion of an action (e.g., by the top-ranked skill determined by the ranker component). Explicit feedback may be solicited through the dialog speechlet 152. In yet another example, a dynamic routing adjustment may send request data that matches predicate data defined using the dynamic routing adjustment component to a newly-implemented skill 190. The decider engine 132 may determine that the top ranked result from the ranking component 120 should be ignored due to the dynamic routing adjustment being performed by the dynamic routing adjustment component. Additionally, in some examples, a policy of the decider engine 132 may be to solicit explicit feedback from the user whenever a new skill is routed to due to a dynamic routing adjustment. Accordingly, at the completion of the action, the decider engine 132 may control TTS to inquire as to whether the user was satisfied with the interaction with the new skill and/or whether the performed action was the action intended by the user.

Decider engine 132 may output plan data that comprises a routing plan 134 for processing the request data. The routing plan 134 may define a target skill 190 to process the request data. As described above, the target skill 190 may be selected as the top-ranked hypothesis determined by the ranking component 120. In some other examples, the decider engine 132 may select a target skill 190 based on a policy and/or based on a class of the request data, as described above. In some examples, the ranking component 120 may determine that two different skills are equally applicable for processing the request data. In such examples, the decider engine 132 may determine that disambiguation should occur. Accordingly, the routing plan 134 may include sending the request data to a dialog speechlet 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider engine 132 may determine that the top two hypotheses of ranking component 120 are equally likely (or approximately equally likely) and may determine that a question should be asked to disambiguate between the two possible actions. Accordingly, the routing plan 134 may route the request data to the dialog speechlet 152, and the dialog speechlet 152 may inquire whether the user intended to play the movie or the soundtrack.

In another example, the decider engine 132 may determine that the user was not satisfied with the top hypothesis of the ranking component 120 (e.g., due to explicit or implicit feedback received from the user in response to taking an action associated with the top ranking component 120 hypothesis). Accordingly, the decider engine 132 may determine that the routing plan 134 should be to determine the second highest ranked hypothesis of the ranking component 120. The routing plan 134 may be sent to the fallback engine 136. In various examples, the fallback engine 136 may determine a list of the top hypotheses, top intents, and/or top ASR text interpretations from the previous turn of dialog, and may select a fallback option for processing the request data from the lists.

Figure 3:
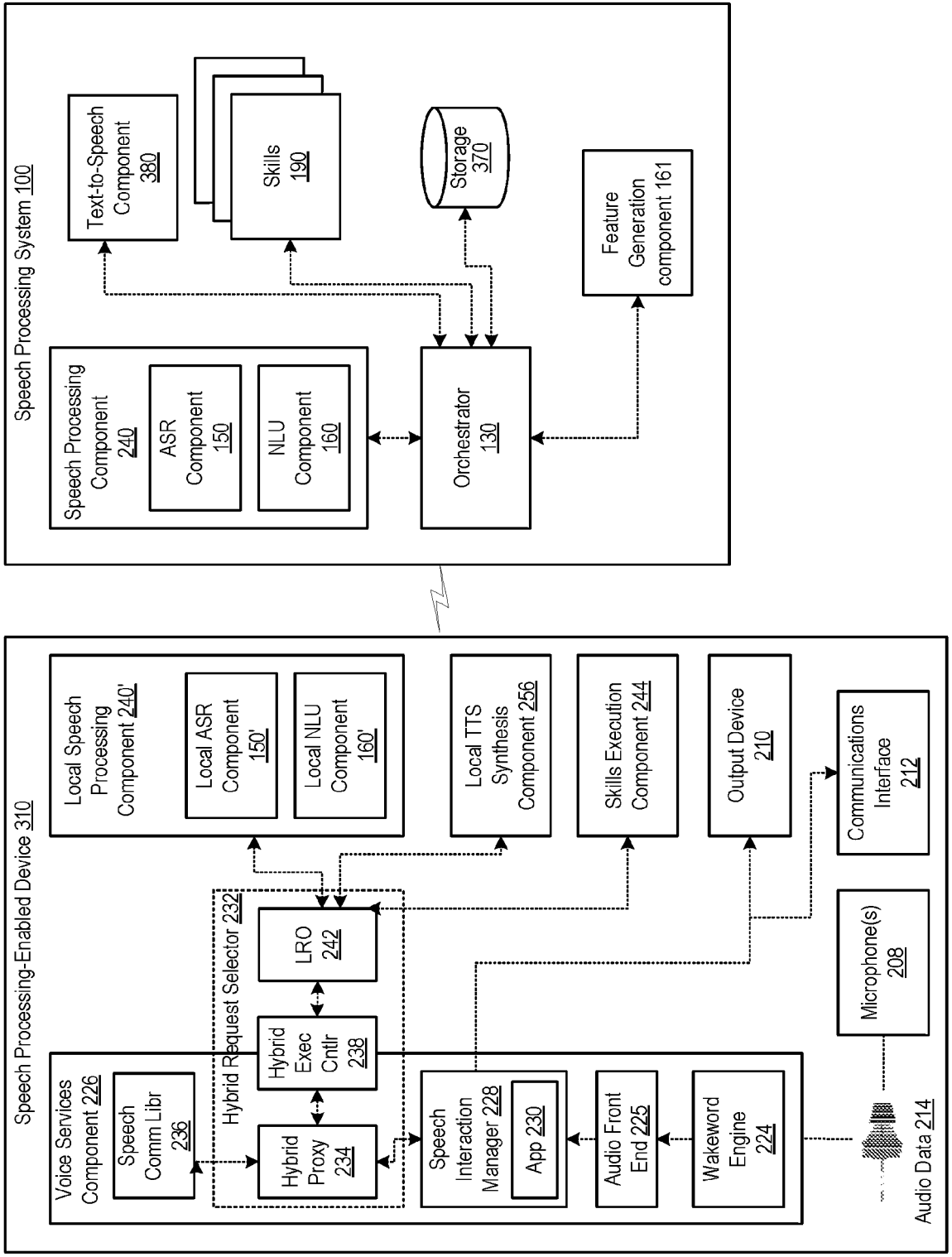
FIG. 3 is a block diagram illustrating a speech processing-enabled device and a speech processing management system, in accordance with embodiments of the present disclosure.

FIG. 3 is a block diagram illustrating a speech processing-enabled device and a speech processing management system, in accordance with embodiments of the present disclosure. Speech processing-enabled device 310 may include microphones 208 (e.g., far-field microphone arrays) used to transform audio into electrical signals. Speech processing may then be performed, either locally by the speech processing-enabled device 310, by one or more other computing devices communicating with the speech processing-enabled device 310 over a network (e.g., speech processing system 100), or by some combination of the speech processing-enabled device 310 and the one or more other computing devices. In various examples, speech processing-enabled device 310 may include and/or may be configured in communication with output device(s) 210 (e.g., speakers and/or displays) effective to output information obtained in response to a user's spoken request or command, or to output content that may be of interest to one or more users. As used herein, a display of speech processing-enabled device 310 refers to a display effective to output graphics such as images and/or video. Further, as used herein, a displayless device refers to a device that does not include a display that is effective to render graphical images or text.

A speech processing enabled computing system may respond to user utterances by outputting content and/or performing one or more other actions, such as playing music, providing information, calling a taxi, displaying an image, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 208 to capture utterances and convert them into digital audio data 214, the speech processing-enabled device 310 may additionally, or alternatively, receive audio data 214 (e.g., via the communications interface 212) from another device in the environment. Under normal conditions, the speech processing-enabled device 310 may operate in conjunction with and/or under the control of a remote, network-based or network-accessible speech processing system 100. The speech processing system 100 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The speech processing system 100 may be configured to provide particular functionality to large numbers of local (e.g., in-home, in-car, etc.) devices of different users. The WAN is representative of any type of public or private, wide area network, such as the Internet, which extends beyond the environment of the speech processing-enabled device 310. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the speech processing system 100 may be configured to receive audio data 214 from the speech processing-enabled device 310, to recognize speech in the received audio data 214, and to perform functions in response to the recognized speech. In some embodiments, these functions involve sending a command, from the speech processing system 100, to the speech processing-enabled device 310 to cause the speech processing-enabled device 310 to perform an action, such as output an audible response to the user speech via output device 210 (e.g., one or more loudspeakers). Thus, under normal conditions, when the speech processing-enabled device 310 is able to communicate with the speech processing system 100 over a WAN (e.g., the Internet), some or all of the functions capable of being performed by the speech processing system 100 may be performed by sending a command over a WAN to the speech processing-enabled device 310, which, in turn, may process the command for performing actions. For example, the speech processing system 100, via a remote command that is included in remote response data, may instruct the speech processing-enabled device 310 to output an audible response (e.g., using a local text-to-speech (TTS) synthesis component 256) to a user's question, to output content (e.g., music) via output device 210 (e.g., one or more loudspeakers) of the speech processing-enabled device 310, or to control other devices in the local environment (e.g., the user's home 101). It is to be appreciated that the speech processing system 100 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the speech processing-enabled device 310 may include a local voice services component 226. When a user utterance including the wakeword is captured by the microphone 208 of the speech processing-enabled device 310, the audio data 214 representing the utterance is received by a wakeword engine 224 of the voice services component 226. The wakeword engine 224 may be configured to compare the audio data 214 to stored models used to detect a wakeword (e.g., "Computer") that indicates to the speech processing-enabled device 310 that the audio data 214 is to be processed for determining an intent. Thus, the wakeword engine 224 is configured to determine whether a wakeword is detected in the audio data 214, and, if a wakeword is detected, the wakeword engine 224 can proceed with routing the audio data 214 to an audio front end (AFE) 225 (sometimes referred to as an acoustic front end (AFE)) of the voice services component 226. If a wakeword is not detected in the audio data 214, the wakeword engine 224 can refrain from sending the audio data 214 to the AFE 225, thereby preventing the audio data 214 from being further processed. The audio data 214 can be discarded.

The AFE 225 is configured to transform the audio data 214 received from the wakeword engine 224 into data for processing by a suitable ASR component and/or NLU component. The AFE 225 may reduce noise in the audio data 214 and divide the digitized audio data 214 into frames representing a time intervals for which the AFE 225 determines a number of values, called features, representing the qualities of the audio data 214, along with a set of those values, called a feature vector, representing the features/qualities of the audio data 214 within the frame. Many different features may be determined, and each feature represents some quality of the audio data 214 that may be useful for ASR processing and/or NLU processing. A number of approaches may be used by the AFE 225 to process the audio data 214, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 225 is configured to use beamforming data to process the received audio data 214. Beamforming can be used to distinguish between the directions from which speech and noise originate. Accordingly, the microphones 208 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 214, used by the AFE 225 in beamforming, may be determined based on results of the wakeword engine 224's processing of the audio data 214. For example, the wakeword engine 224 may detect the wakeword in the audio data 214 from a first microphone 208 at time, t, while detecting the wakeword in the audio data 214 from a second microphone 208 a millisecond later in time (e.g., time, t+1 millisecond), and so on and so forth, for any suitable number of audio signals corresponding to multiple microphones 208 in a microphone array.

A speech interaction manager (SIM) 228 of the voice services component 226 may receive the audio data 214 that has been processed by the AFE 225. The SIM 228 may manage received audio data 214 by processing request data and non-speech noise or sounds as events, and the SIM 228 may also manage the processing of commands that are used to respond to the user speech or non-speech noise or sounds (e.g., by controlling the action(s) of the speech processing-enabled device 310). The SIM 228 may include one or more client applications 230 for performing various functions at the speech processing-enabled device 310.

A hybrid request selector component 232 of the speech processing-enabled device 310 is shown as including a hybrid proxy component (HP) 234, among other components. The HP 234 can be implemented as a layer within the voice services component 226 that is located between the SIM 228 and a speech communication library (SCL) 236, and may be configured to proxy traffic to/from the speech processing system 100. For example, the HP 234 may be configured to pass messages between the SIM 228 and the SCL 236 (such as by passing events and instructions there between), and to send messages to/from a hybrid execution controller component (HEC) 238 of the hybrid request selector component 232. For instance, command data received from the speech processing system 100 can be sent to the HEC 238 using the HP 234, which sits in the path between the SCL 236 and the SIM 228. The HP 234 may also be configured to allow audio data 214 received from the SIM 228 to pass through to the speech processing system 100 (via the SCL 236) while also receiving (e.g., intercepting) this audio data 214 and sending the received audio data 214 to the HEC 238 (sometimes via an additional SCL).

As will be described in more detail below, the HP 234 and the HEC 238 are configured to perform a handshake procedure to connect to each other. As part of this handshake procedure, the HP 234 and the HEC 238 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 238 determines whether to accept or reject the connection request from the HP 234. If the HEC 238 rejects the HP's 234 connection request, the HEC 238 can provide metadata to the HP 234 that provides a reason why the connection request was rejected.

A local speech processing component 240' (sometimes referred to as a "speech processing component," a "spoken language understanding (SLU) component," a "speech engine," or an "engine") is configured to process audio data 214 (e.g., audio data 214 representing user speech, audio data 214 representing non-speech noise or sounds, etc.). In some embodiments, the hybrid request selector component 232 may further include a local request orchestrator component (LRO) 242. The LRO 242 is configured to notify the local speech processing component 240' about the availability of new audio data 214 that represents user speech, and to otherwise initiate the operations of the local speech processing component 240' when new audio data 214 becomes available. In general, the hybrid request selector component 232 may control the execution of the local speech processing component 240', such as by sending "execute" and "terminate" events/instructions to the local speech processing component 240'. An "execute" event may instruct the local speech processing component 240' to continue any suspended execution based on audio data 214 (e.g., by instructing the local speech processing component 240' to execute on a previously-determined intent in order to generate a command). Meanwhile, a "terminate" event may instruct the local speech processing component 240' to terminate further execution based on the audio data 214, such as when the speech processing-enabled device 310 receives command data from the speech processing system 100 and chooses to use that remotely-generated command data.

The LRO 242 may interact with a skills execution component 244 that is configured to receive intent data output from the local speech processing component 240' and to execute a skill based on the intent.

To illustrate how the speech processing-enabled device 310 can operate at runtime, consider an example where a user utters an expression, such as "Computer, turn off the kitchen lights." The audio data 214 is received by the wakeword engine 224, which detects the wakeword "Computer," and forwards the audio data 214 to the SIM 228 via the AFE 225 as a result of detecting the wakeword. The SIM 228 may send the audio data 214 to the HP 234, and the HP 234 may allow the audio data 214 to pass through to the speech processing system 100 (e.g., via the SCL 236), and the HP 234 may also input the audio data 214 to the local speech processing component 240′ by routing the audio data 214 through the HEC 238 of the hybrid request selector 232, whereby the LRO 242 notifies the local speech processing component 240′ of the incoming audio data 214. At this point, the hybrid request selector 232 may wait for response data from the speech processing system 100 and/or the local speech processing component 240′.

The local speech processing component 240′ is configured to receive the audio data 214 from the hybrid request selector 232 as input, to recognize speech (and/or non-speech audio events) in the audio data 214, to determine an intent (e.g., user intent) from the recognized speech (or non-speech audio event). This intent can be provided to the skills execution component 244 via the LRO 242, and the skills execution component 244 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 244 (and/or the speech processing system 100) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the WAN 105. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local speech processing component 240′ may include an automatic speech recognition (ASR) component 150′ that is configured to perform ASR processing on the audio data 214 to convert the audio data 214 into text data (sometimes referred to herein as "ASR text data," an "ASR result", or "ASR data"). ASR transcribes audio data 214 into text data representing the words of the user speech contained in the audio data 214. A spoken utterance in the audio data 214 can be input to the local ASR component 150′, which then interprets the utterance based on the similarity between the utterance and pre-established language models available to the local speech processing component 240′. In some embodiments, the local ASR component 150′ outputs the most likely text recognized in the audio data 214, or multiple hypotheses in the form of a lattice or an N-best list with individual hypotheses corresponding to confidence scores or other scores (such as probability scores, etc.). In some embodiments, the local ASR component 150′ is customized to the user (or multiple users) who created a user account to which the speech processing-enabled device 310 is registered. For instance, the language models (and other data) used by the local ASR component 150′ may be based on known information (e.g., preferences) of the user, and/or on a history of previous interactions with the user.

The local speech processing component 240′ may also include a local NLU component 160′ that performs NLU processing on the generated ASR text data to determine intent data and/or slot data (referred to herein as a "NLU result", or "NLU data") so that directives may be determined (e.g., by the skills execution component 244) based on the intent data and/or the slot data. Generally, the local NLU component 160′ takes textual input (such as text data generated by the local ASR component 150′) and attempts to make a semantic interpretation of the ASR text data.

Speech Processing System

In other situations, the speech processing-enabled device 310 may send the audio data 214 to the speech processing system 100 for processing. As described above, the speech processing-enabled device 310 may capture audio using the microphone 208, and send audio data 214 (e.g., representing a spoken user request), corresponding to the captured audio, to the speech processing system 100. The speech processing-enabled device 310 may include a wakeword detection component that detects when input audio includes a spoken wakeword, and when the wakeword is detected, the audio data 214 is sent by the speech processing-enabled device 310 to the speech processing system 100.

Upon receipt by the speech processing system 100, the audio data 214 may be sent to an orchestrator 130. The orchestrator 130 may include memory and logic that enables the orchestrator 130 to send various pieces and forms of data to various components of the system.

Similar to the operation described above with respect to the local speech processing component 240′ of the speech processing-enabled device 310, the orchestrator 130 may send the audio data 214 to a speech processing component 240. An ASR component 150 of the speech processing component 240 transcribes the audio data 214 into one or more hypotheses representing speech contained in the audio data 214. The speech processing component 240 interprets the speech in the audio data based on a similarity between the characteristics of the audio data corresponding to the speech and pre-established language models. For example, the speech processing component 240 may compare the audio data 214 with models for sounds (e.g., subword units such as phonemes) and sequences of sounds to identify words that match the sequence of sounds in the speech represented in the audio data 214. The speech processing component 240 may send text data generated thereby to an NLU component 160 of the speech processing component 240. The text data output by the speech processing component 240 may include a top scoring hypothesis of the speech represented in the audio data 214 or may include an N-best list including a group of hypotheses of the speech represented in the audio data 214, and potentially respective scores ASR processing confidence scores.

The NLU component 160 attempts to make a semantic interpretation of the phrases or statements represented in the text data input therein. That is, the NLU component 160 determines one or more meanings associated with the phrases or statements represented in the text data based on individual words represented in the text data. The NLU component 160 interprets a text string to derive an intent of the user (e.g., an action that the user desires be performed) as well as pertinent pieces of information in the text data that allow a device (e.g., the speech processing system 100) to complete the intent. For example, if the text data corresponds to "Play the new album by [Musical_Artist]", the NLU component 160 may determine the user intended to invoke a music playback intent to play the identified album.

The speech processing system 100 may include a non-transitory computer-readable memory 370, storing various instructions for operation of the speech processing system 100.

As described above, the speech processing system 100 may include one or more skills 190. The speech processing system 100 may also include a TTS component 380 that synthesizes speech (e.g., generates audio data) corresponding to text data input therein. The TTS component 380 may perform speech synthesis using one or more different methods. In one method of synthesis called unit selection, the TTS component 380 matches text data against one or more databases of recorded speech. Matching units are selected and concatenated together to form audio data. In another method of synthesis called parametric synthesis, the TTS component 380 varies parameters such as frequency, volume, and noise to create an artificial speech waveform output. Parametric synthesis uses a computerized voice generator, sometimes called a vocoder.

The various components of the speech processing system 100 and the speech processing-enabled device 310 described herein may be implemented in software, hardware, firmware, or some combination thereof.

The speech processing system 100 may reside on speech processing-enabled device 310, in a cloud computing environment, or some combination thereof. For example, the speech processing-enabled device 310 may include computing equipment, some portion of which is configured with some or all of the components or functionality of speech processing system 100 and another portion of which is configured with some or all of the components or functionality of computing device(s) used in speech processing system 100. The speech processing-enabled device 310 may then perform a variety of functions on its own (such as when remote communications are unavailable), and/or may communicate (when capable) with computing device(s) and/or the speech processing system 100 to perform other functions. Alternatively, all of the functionality may reside on the speech processing-enabled device 310 or remotely.

Feature generation component 161 may generate feature data according to feature definitions supplied by various speech processing components during registration, as described above in reference to FIGS. 1-2. The feature data so generated may be cached by feature generation component (e.g., in local cache 170 and/or distributed cache 172) and may be sent by a notification system 180 to the "subscribing" speech processing components (e.g., those speech processing components that have registered to receive the feature data). The feature data may be described as pre-computed and/or pre-cached feature data as the features may be generated in advance of the time that the relevant speech processing components use the features during request data processing. Accordingly, speech processing latency may be reduced by caching the features ahead of time, rather than computing the features in an on-demand fashion during request data processing. For example, a machine learning model of a speech processing component may use feature data comprising data generated by one or more upstream speech processing components during the processing of request data by the one or more upstream speech processing components. Accordingly, when the upstream speech processing component has completed processing the source data may be available to generate the feature data for the downstream speech processing component even if it is not yet time for the downstream speech processing component to process the request data. As such, the feature data may be pre-computed and cached. Thereby, when it is time for the downstream speech processing component to input the feature data into the machine learning model during request data processing, the feature data is pre-cached and available for retrieval. Latency is thereby minimized.

Figure 4:
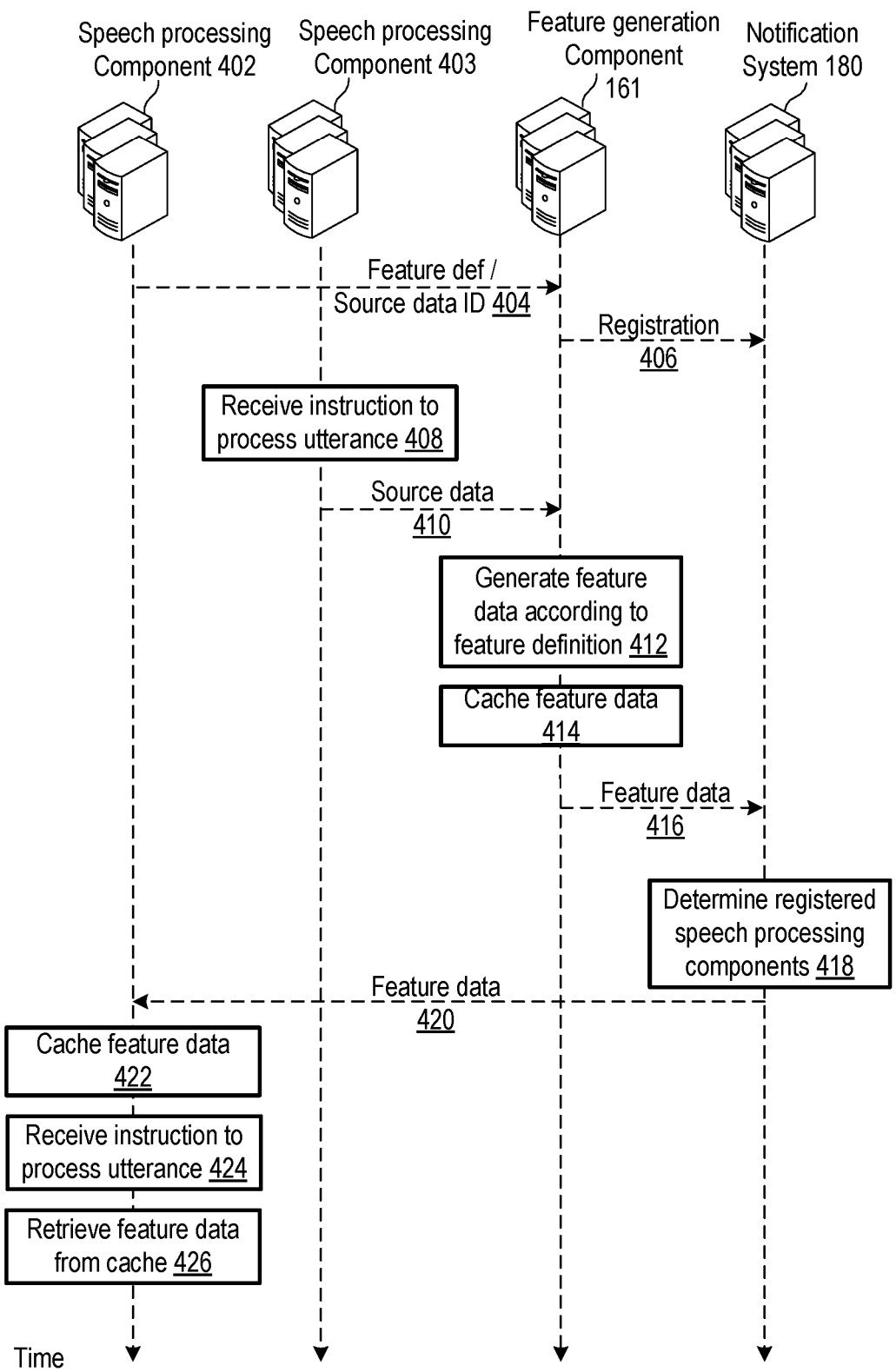
FIG. 4 is a timing diagram illustrating an example process for pre-fetching and caching speech processing feature data, in accordance with embodiments of the present disclosure.

FIG. 4 is a timing diagram illustrating an example process for pre-fetching and caching speech processing feature data, in accordance with embodiments of the present disclosure.

A speech processing component 402 (e.g., a downstream speech processing component, such as ranking component 120, shortlister 110, decider engine 132, etc.) may register with feature generation component 161 at action 404. Registration may include specifying a feature definition and/or identification of source data used to determine the feature (e.g., source data ID). Feature generation component 161 may receive the feature definition data and the source data identifying data and may register the feature definition for the speech processing component 402 with notification system 180 at action 406.

At some later time, speech processing component 403 (which, in some examples, may be an upstream speech processing component relative to speech processing component 402) may receive an instruction to process request data at action 408. In an example, speech processing component 403 may be NLU component 160. Accordingly, action 408 may be a receipt by the NLU component 160 of text data hypotheses from ASR component 150 along with an instruction to perform NLU processing to determine a semantic interpretation of the text data. Following NLU processing, the NLU component 160 may generate NLU output data (e.g., NLU output data 106 described above in reference to FIG. 2). The NLU output data may be the source data for the feature definition registered at actions 404, 406. Accordingly, speech processing component 403 may send the source data comprising the NLU output data to the feature generation component 161 at action 410.

Feature generation component may receive the source data (e.g., the NLU output data) and may generate feature data for speech processing component 402 according to the earlier-provided feature definition at action 412. Feature generation component 161 may cache the feature data (e.g., in local cache 170 and/or distributed cache 172) at action 414. Feature generation component 161 may send the feature data to notification system 180 at action 416. Notification system 180 may determine the speech processing component(s) registered to receive the feature data at action 418. Thereafter, notification system 180 may send the feature data to the registered speech processing component(s) at action 420. In this example, the feature data may be sent to the downstream speech processing component 402. Speech processing component 402 may cache the feature data in a local cache of speech processing component 402 at action 422.

At some later time, speech processing component 402 may receive an instruction to process request data at action 424. For example, if speech processing component 402 is the ranking component 120, the speech processing component 402 may receive an instruction to rank a shortlist of NLU hypotheses. In order to rank the shortlist of NLU hypotheses, the ranking component 120 may input the feature data generated at action 412 into one or more machine learning models of the ranking component 120. Accordingly, the ranking component 120 may retrieve the feature data from a cache at action 426.

In some examples, the speech processing component 402 may first search a local cache to the speech processing component 402 (e.g., local caches 194, 196 of FIG. 1) as retrieving the feature data from a cache local to speech processing component 402 may introduce the least amount of latency. If the feature data is not found in such a local cache (e.g., a cache miss is experienced), the speech processing component 402 may send a request to feature generation component 161 for the feature data. Feature generation component 161 may first search a cache local to the feature generation component 161 (e.g., local cache 170). If the feature data is not available in the cache local to the feature generation component 161, the feature generation component 161 may search for the feature data in a distributed cache via a network call (e.g., distributed cache 172). If another cache miss is experienced, feature generation component 161 may re-compute the feature data according to the feature definition and/or the source data and may send the feature data to the speech processing component 402. As previously described, the speech processing component 402 may use the feature data as an input to a machine learning model in order to generate output data that may be used by the speech processing component 402 in the course of processing the current request data.

Figure 5A:
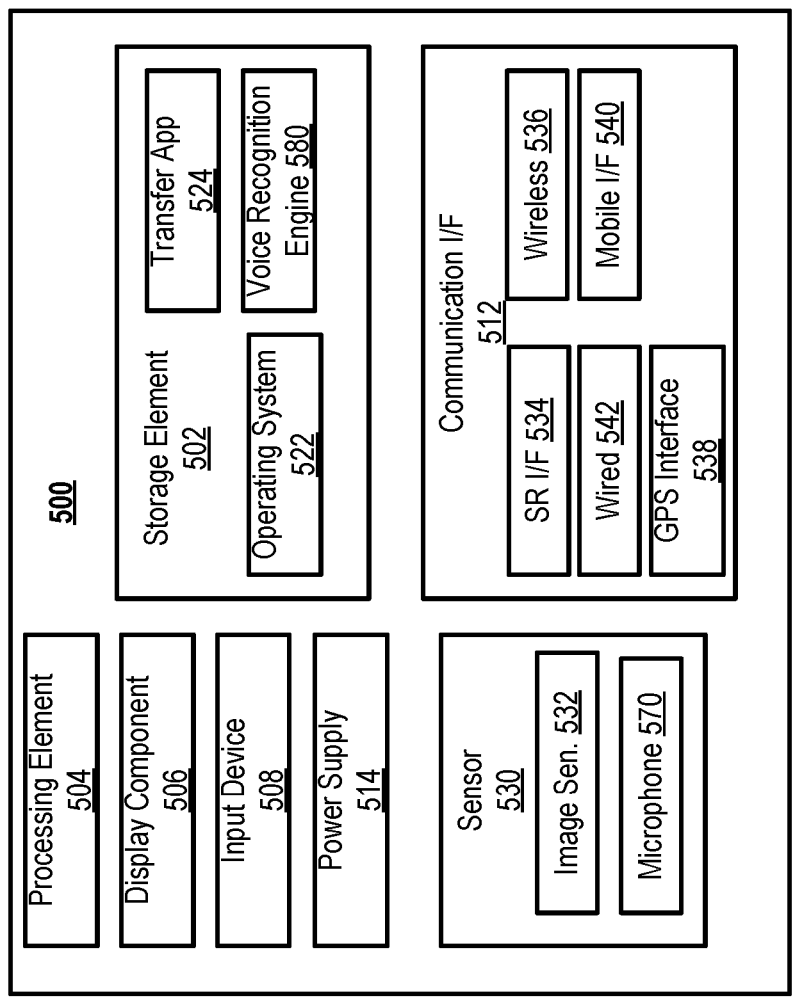
FIGS. 5A-5B are block diagrams showing example system of computing devices that may be used in accordance with various embodiments described herein.

FIG. 5A is a block diagram showing an example system 500 of a computing device that may be used to implement, at least in part, speech processing system 100, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to speech processing system 100. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor 532 and/or microphone 570 included in the system 500. In some examples, the transfer application 524 may also be configured to send the received voice requests to one or more voice recognition servers (e.g., speech processing system 100).

When implemented in some user devices, the system 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone 570 or an array of microphones for capturing sounds, such as voice requests. Voice recognition engine 580 may interpret audio signals of sound captured by microphone 570. In some examples, voice recognition engine 580 may listen for a "wakeword" to be received by microphone 570. Upon receipt of the wakeword, voice recognition engine 580 may stream audio to a voice recognition server for analysis, such as speech processing system 100. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol.

The system 500 may also include one or more sensors 530 such as, for example, one or more position sensors, image sensors, and/or motion sensors. An image sensor 532 and microphone 570 are shown in FIG. 5A. An example of an image sensor 532 may be a camera configured to capture color information, image geometry information, and/or ambient light information.

Figure 5B:
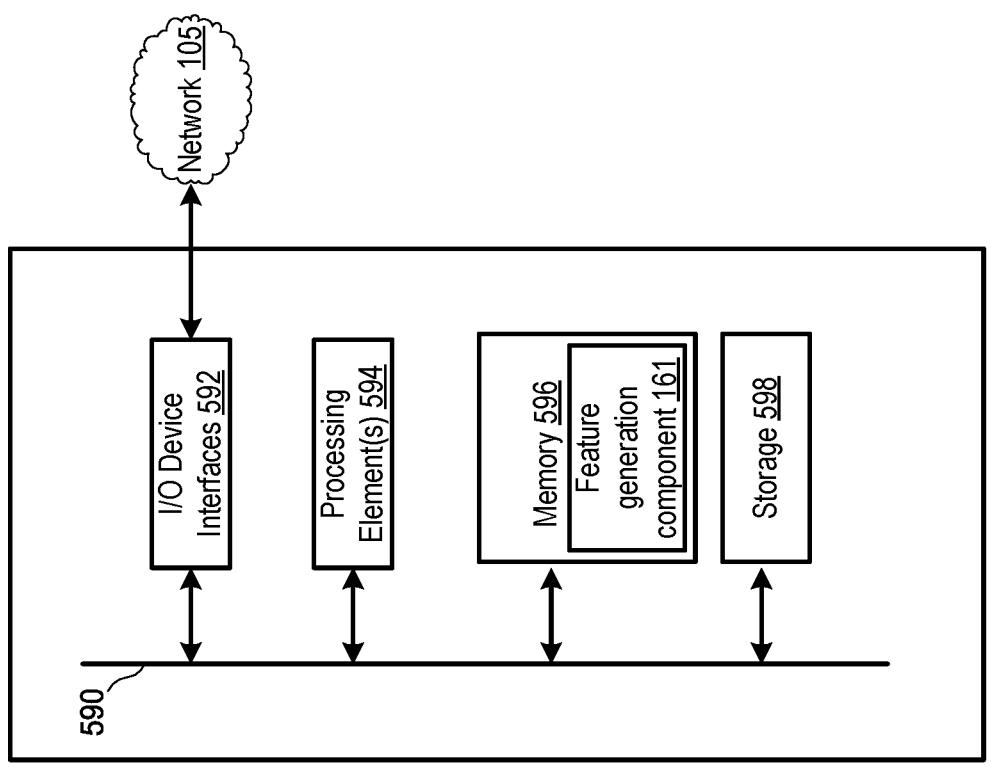

FIG. 5B is a block diagram conceptually illustrating example components of a remote device, such as a computing device executing a particular skill 190, a computing device executing one or more components of speech processing system 100 (e.g., the feature generation component 161, ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of speech processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister 110, etc., when loaded from storage 598. In various further examples, memory 596 may be effective to store instructions effective to program controllers/processors 594 to perform the various techniques described above in reference to feature generation component 161, decider engine 132, and/or the dynamic routing adjustment described above in reference to FIGS. 1-4. Accordingly, in FIG. 5B, feature generation component 161 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of speech processing system 100 may also include storage 598 for storing data and controller/processor-executable instructions. Each data storage component 598 may individually include one or more non-volatile storage types such as magnetic storage, optical storage, solid-state storage, etc. Each computing device of speech processing system 100 may also be connected to removable or external non-volatile memory and/or storage (such as a removable memory card, memory key drive, networked storage, etc.) through respective input/output device interfaces 592. In various examples, the feature data described above in reference to feature generation component 161, may be stored in memory 596 and/or storage 598.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), storage 598, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of speech processing system 100 may include an address/data bus 590 for conveying data among components of the respective device. Each component within a computing device of speech processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the speech processing system 100, as described herein, are exemplary, and may be located as a stand-alone device or may be included, in whole or in part, as a component of a larger device or system.

Figure 6:
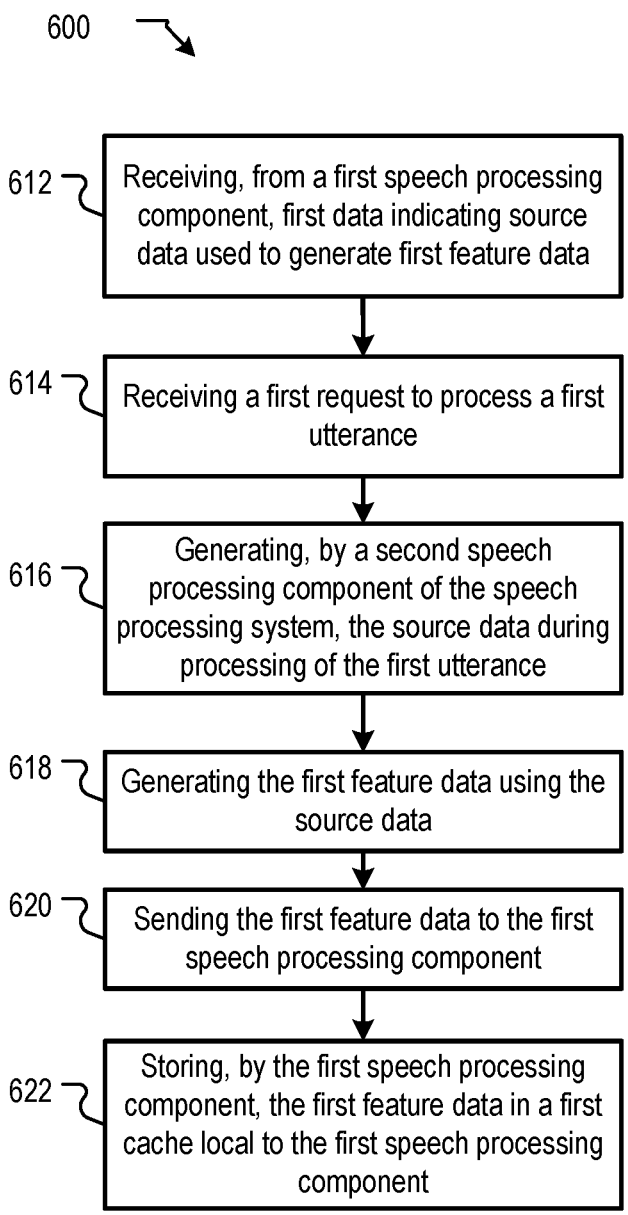
FIG. 6 depicts a flow chart showing an example process for generating and caching pre-computed feature data used for request data processing in a speech processing system, in accordance with various aspects of the present disclosure.

FIG. 6 depicts a flow chart showing an example process 600 for generating and caching pre-computed feature data used for request data processing in a speech processing system, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 612, at which first data (e.g., feature definition data indicating source data used to generate first feature data) may be received by feature generation component 161 from a first speech processing component (e.g., ranking component 120, NLU component 160, shortlister 110, etc.). The definition data may comprise a feature definition that may be used by a particular machine learning model of the first speech processing component. In various examples, the first data may specify one or more functions that may be used to calculate the feature as well as source data that may be used as an input to the function used to calculate the feature. In some implementations, the feature definition may specify the source data which may, itself, be used as the feature. In other examples, one or more operations and/or calculations may be performed on the source data in order to transform the source data into a form (e.g., into an appropriate number of dimensions) that is useful for input into the relevant machine learning model.

Processing may continue from action 612 to action 614, at which a first request to process first request data may be received. In various examples, the request to process the first request data may be received by speech processing system 100 from a speech processing enabled device. In at least some examples, the request may include audio data representing a command and/or request to perform some action by the speech processing system. In various examples, orchestrator 130 may receive the request and may initiate a dialog session in response to the request.

Processing may continue from action 614 to action 616, at which a second speech processing component of the speech processing system may generate the source data during processing of the first request data. In various examples, the second speech processing component may be processing the request data received at action 614 and may generate the source data as a result of processing the request data. For example, the second speech processing component may be NLU component 160 and the source data may be NLU output data 106 generated by NLU component 160 during the processing of request data.

Processing may continue from action 616 to action 618, at which the feature generation component 161 may use the source data to generate the first feature data according to the feature definition supplied by the first speech processing device during registration.

Processing may continue from action 618 to action 620, at which the feature data may be sent to the first speech processing component by the notification system 180 and/or by the feature generation component 161. In various examples, the notification system 180 may send the feature data to the first speech processing component in response to a determination that the first speech processing component has registered to receive that particular feature data. In addition, the notification system 180 may determine if any other speech processing components have registered to receive the particular feature data. If so, the notification system 180 may send the feature data to any other speech processing components that have registered to receive the particular feature data.

Processing may continue from action 620 to action 622, at which the first speech processing component may store the first feature data in a cache local to the first speech processing component. Thereafter, if/when the first speech processing component receives a request to process the request data, the first feature data may be retrieved from the local cache and used as an input to a machine learning model of the first speech processing component in order to process the request data. In various examples, if the first feature data is not found in the local cache of the first speech processing component, the first speech processing component may query one or more remote caches (e.g., a local cache of feature generation component 161 and/or another cache accessible via a network, such as distributed cache 172).

Figure 7:
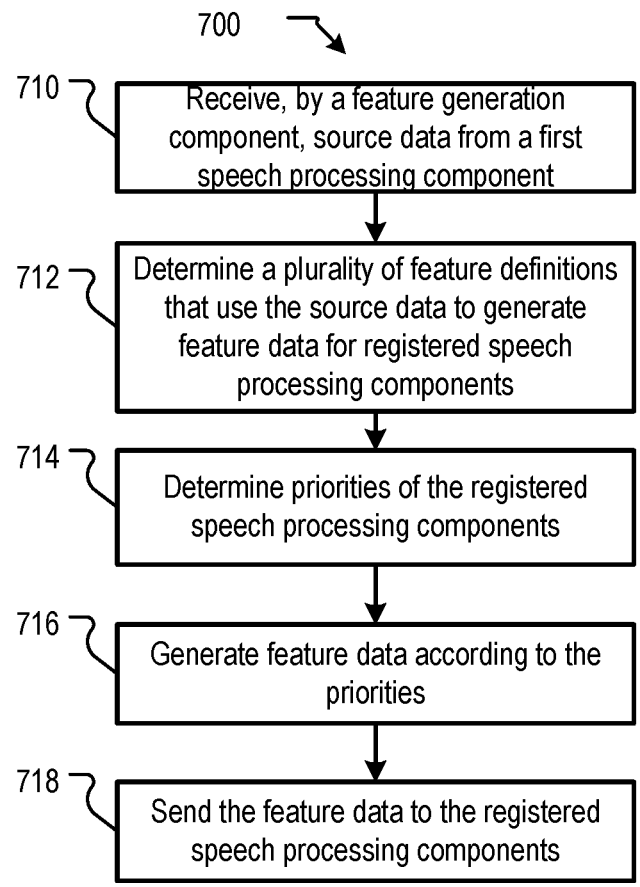
FIG. 7 depicts a flow chart showing an example process for determining priorities for generating and caching pre-computed feature data, in accordance with various aspects of the present disclosure.

FIG. 7 depicts a flow chart showing an example process for determining priorities for generating and caching pre-computed feature data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 700 may begin at action 710, at which feature generation component 161 may receive source data from a first speech processing component. The source data may be generated during the course of processing request data by the speech processing component. For example, the various outputs of the various speech processing components shown and described in reference to FIG. 2 may be examples of the source data.

Processing may continue from action 710 to action 712, at which the feature generation component 161 may determine that a plurality of feature definitions may use the source data to generate respective feature data for speech processing components that have previously registered with the feature generation component 161 and/or with the notification system 180. For example, three different speech processing components may have each registered with the feature generation component 161 for the feature generation component 161 to generate respective feature data using source data output by NLU component 160. In some examples, each of the three different speech processing components may have specified a unique feature definition during registration. Accordingly, although all three speech processing components may use the source data in order to compute the relevant feature data, the feature data used by each of the three speech processing components may be different from one another.

Processing may continue from action 712 to action 714, at which priorities of the registered speech processing components may be determined. In various examples, priorities may be determined for computing the feature data for the various speech processing components in order to minimize latency for the overall speech processing system 100. For example, a first speech processing component may be upstream in the speech processing flow depicted in FIG. 2 relative to other speech processing components that have registered with feature generation component 161. Accordingly, it may be advantageous to compute the feature data for the first speech processing component so that the feature data is cached and available at the time that the first speech processing component is called to process request datarequest data.

Processing may continue from action 714 to action 716, at which feature data may be generated according to the priorities determined at action 714. The feature data may be generated in a specific order based on the priorities of the speech processing components that consume the feature data. In general, feature data for speech processing components with higher priority may be computed before featue data for speech processing components with lower priority. Processing may continue from action 716 to action 718 at which the feature data may be sent to the registered speech processing components for caching in their respective local caches.

Figure 8:
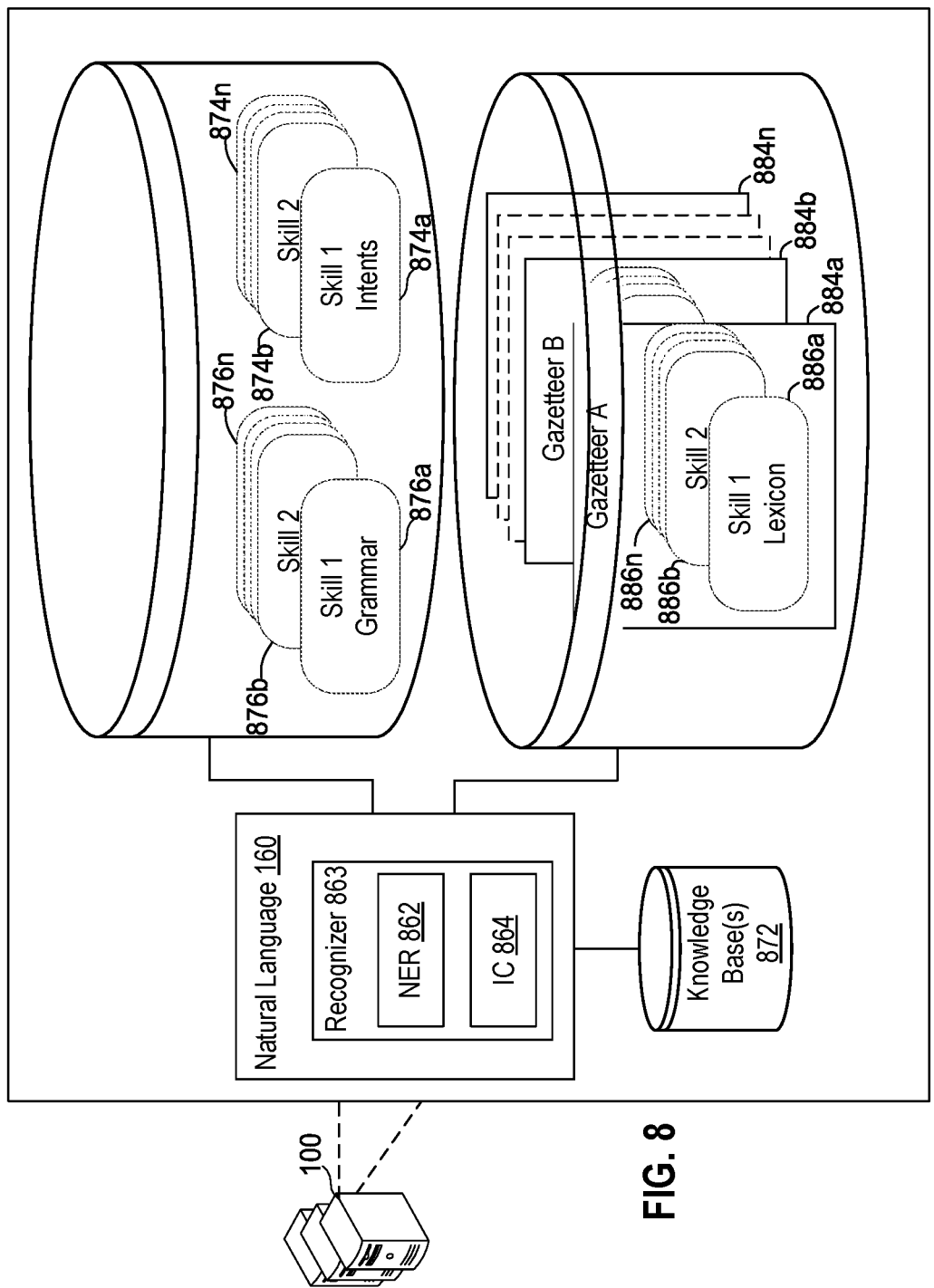
FIG. 8 is a conceptual diagram illustrating how natural language understanding processing is performed according to embodiments of the present disclosure.

FIG. 8 illustrates how NLU processing is performed on text data. Generally, the NLU component 160 attempts to make a semantic interpretation of text data input thereto. That is, the NLU component 160 determines the meaning behind text data based on the individual words and/or phrases represented therein. The NLU component 160 interprets text data to derive an intent of the user as well as pieces of the text data that allow a device (e.g., a speech processing enabled device, the speech processing system 100, etc.) to complete that action.

The NLU component 160 may process text data including several ASR hypotheses. The NLU component 160 may process all (or a portion of) the ASR hypotheses input therein. Even though the ASR component 150 may output multiple ASR hypotheses, the NLU component 160 may be configured to only process with respect to the top scoring ASR hypothesis. Additionally, as described herein, the ASR component 150 may generate confidence scores associated with each hypothesis (e.g., the confidence scores described above in reference to Table 1).

The NLU component 160 may include one or more recognizers 863. Each recognizer 863 may be associated with a different skill. Each recognizer 863 may process with respect to text data input to the NLU component 160. Each recognizer 863 may operate at least partially in parallel with other recognizers 863 of the NLU component 160.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill. The NER component 862 (or other component of the NLU component 160) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user and/or speech processing enabled device. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.). As previously described, each recognizer 863 may generate confidence scores associated with each named entity and/or with each match of a named entity. In at least some examples, pre-computed features generated by the feature generation component 161 may be used by the NER component 862 and/or by NLU component 160, generally, in order to generate the N-best list of intents and/or skills for processing particular request data.

Each grammar model 876 includes the names of entities (i.e., nouns) commonly found in speech about the particular skill to which the grammar model 876 relates, whereas the lexicon 886 is personalized to the user and/or a speech processing enabled device from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play { Artist Name}," "Play {Album Name}," "Play {Song name}," "Play {Song name} by { Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as { Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type / semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent} <PlayMusic>, {artist name} rolling stones, {media type} SONG, and {song title} mother's little helper. For further example, the NER component 862 may tag "play songs by the rolling stones" as: {skill} Music, {intent} <PlayMusic>, {artist name} rolling stones, and {media type} SONG.

The NLU component 160 may generate cross-skill N-best list data, which may include a list of NLU hypotheses output by each recognizer 863. A recognizer 863 may output tagged text data generated by an NER component 862 and an IC component 864 operated by the recognizer 863, as described above. Each NLU hypothesis including an intent indicator and text / slots may be grouped as an NLU hypothesis represented in a cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

Ranking component 120 may assign a particular confidence score to each NLU hypothesis input therein. As previously described, machine learning models of the ranking component 120 may use precomputed features generated by feature generation component 161 as inputs along with the cross-skill N-best list data in order to generate the confidence scores for each NLU hypothesis of the cross-skill N-best list data. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the NER component 862.

The ranking component 120 may apply re-scoring, biasing, and/or other techniques to determine the top scoring NLU hypotheses. To do so, the ranking component 120 may consider not only the data output by the NER component 862, but may also consider other data such as skill rating, popularity data, context data, and/or other features computed by feature generation component 161.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed:

1. A method, comprising:

receiving, by a feature generation component, first data representing a feature definition for a machine learning model of a skill ranking component;

receiving first input data representing a user request;

determining, from the first input data, natural language understanding (NLU) data representing the user request, the NLU data comprising skill identifier data and intent data representing a semantic interpretation of the user request;

generating, by the feature generation component, first feature data from the skill identifier data and the intent data using the feature definition;

sending, by the feature generation component, the first feature data to the skill ranking component;
storing, by the skill ranking component, the first feature data in a first cache local to the skill ranking component;
storing, by the feature generation component, the first feature data in a second cache local to the feature generation component; and
generating, by the skill ranking component, a ranked list of speech processing skills for processing the user request by inputting the first feature data into the machine learning model of the skill ranking component.

2. The method of claim 1, further comprising:
receiving, by the skill ranking component, an unranked list of speech processing skills as candidate skills for processing the first input data;
searching, by the skill ranking component, the first cache for the first feature data;
determining a cache miss in response to the searching the first cache for the first feature data, wherein the cache miss indicates that the first feature data is not currently stored in the first cache;
sending a request for the first feature data to the feature generation component;
searching, by the feature generation component, the second cache for the first feature data;
determining, by the feature generation component, a location in the second cache of the first feature data; and
sending, by the feature generation component, the first feature data to the skill ranking component.

3. The method of claim 1, further comprising:
receiving, by the skill ranking component, an unranked list of speech processing skills as candidate skills for processing the first input data;
searching, by the skill ranking component, the first cache for the first feature data;
determining a first cache miss in response to the searching the first cache for the first feature data, wherein the first cache miss indicates that the first feature data is not currently stored in the first cache;
sending a request for the first feature data to the feature generation component;
determining a second cache miss in response to searching, by the feature generation component, the second cache for the first feature data, wherein the second cache miss indicates that the first feature data is not currently stored in the second cache; and
generating, by the feature generation component, second feature data from the skill identifier data and the intent data using the feature definition.

4. A method comprising:
receiving, from a first speech processing component of a speech processing system having a first cache, first data representing a feature definition for first feature data, the first data identifying source data used to generate the first feature data;
receiving a first request to process first input data;
generating, by a second speech processing component of the speech processing system, the source data during processing of the first input data;
generating the first feature data using the source data;
sending the first feature data to the first speech processing component; and
storing, by the first speech processing component, the first feature data in the first cache of the first speech processing component.

5. The method of claim 4, further comprising:
receiving, by the first speech processing component, instructions to process the first input data;
receiving, by the first speech processing component, the first feature data from the first cache; and
inputting the first feature data into a machine learning model of the first speech processing component.

6. The method of claim 4, further comprising storing the first feature data in a second cache accessible over a network by the first speech processing component.

7. The method of claim 6, further comprising:
receiving, by the first speech processing component, instructions to process the first input data;
searching the first cache for the first feature data; and
sending a request to retrieve the first feature data from a second cache, wherein the second cache is located at a remote device accessible over a network.

8. The method of claim 4, further comprising:
receiving, by the first speech processing component, instructions to process the first input data;
searching the first cache for the first feature data;
sending a second request to retrieve the first feature data from a second cache;
receiving, by the first speech processing component, a cache miss from the second cache;
sending, by the first speech processing component, a third request to generate the first feature data; and
generating a second instance of the first feature data using the source data.

9. The method of claim 4, wherein the generating the first feature data using the source data is performed by a feature generation component, the method further comprising:
storing, by the feature generation component, the first feature data in a second cache local to the feature generation component; and
storing, by the feature generation component, the first feature data in a third cache, wherein the third cache is a distributed cache located remotely from the feature generation component and accessible by the feature generation component over at least one network.

10. The method of claim 4, further comprising:
receiving, from a third speech processing component, second data identifying second source data used to generate second feature data;
generating, by the second speech processing component of the speech processing system, the second source data during processing of the first input data;
determining that the third speech processing component processes the first input data prior to the second speech processing component processing the first input data; and
generating the second feature data using the second source data prior to generating the first feature data using the source data.

11. The method of claim 4, further comprising:
receiving a second request to process a second input data;
generating, by the second speech processing component of the speech processing system, second source data during processing of the second input data;
generating second feature data using the second source data;
sending the second feature data to the first speech processing component; and
overwriting, by the first speech processing component, the first feature data in the first cache with the second feature data.

12. The method of claim 4, further comprising:
generating, by a natural language understanding component of the speech processing system, an intent representing a semantic interpretation of the first input data; and generating the first feature data based at least in part on the intent.

13. A computing device, comprising:
at least one processor; and
at least one non-transitory computer-readable memory storing instructions that, when executed by the at least one processor are effective to program the at least one processor to:
  receive, from a first speech processing component of a speech processing system, first data representing a feature definition for first feature data, the first data indicating source data used to generate the first feature data;
  receive a first request to process a first input data;
  generate, by a second speech processing component of the speech processing system, the source data during processing of the first input data;
  generate the first feature data using the source data;
  send the first feature data to the first speech processing component; and
  store, by the first speech processing component, the first feature data in a first cache local to the first speech processing component.

14. The computing device of claim 13, the at least one non-transitory computer-readable memory storing further instructions that, when executed by the at least one processor, are further effective to program the at least one processor to:
  receive, by the first speech processing component, instructions to process the first input data;
  receive, by the first speech processing component, the first feature data from the first cache; and
  input the first feature data into a machine learning model of the first speech processing component.

15. The computing device of claim 13, the at least one non-transitory computer-readable memory storing further instructions that, when executed by the at least one processor, are further effective to program the at least one processor to store the first feature data in a second cache accessible over a network by the first speech processing component.

16. The computing device of claim 15, the at least one non-transitory computer-readable memory storing further instructions that, when executed by the at least one processor, are further effective to program the at least one processor to:
  receive, by the first speech processing component, instructions to process the first input data;
  search the first cache for the first feature data; and
  send a request to retrieve the first feature data from the second cache.

17. The computing device of claim 13, the at least one non-transitory computer-readable memory storing further instructions that, when executed by the at least one processor, are further effective to program the at least one processor to:
  receive, by the first speech processing component, instructions to process the first input data;
  search the first cache for the first feature data;
  send a second request to retrieve the first feature data from a second cache;
  receive, by the first speech processing component, a cache miss from the second cache;
  send, by the first speech processing component, a third request to generate the first feature data; and
  generate a second instance of the first feature data using the source data.

18. The computing device of claim 13, wherein the generation of the first feature data using the source data is performed by a feature generation component, and wherein the at least one non-transitory computer-readable memory stores further instructions that, when executed by the at least one processor, are further effective to program the at least one processor to:
  store, by the feature generation component, the first feature data in a second cache local to the feature generation component; and
  store, by the feature generation component, the first feature data in a third cache, wherein the third cache is a distributed cache located remotely from the feature generation component and accessible by the feature generation component over at least one network.

19. The computing device of claim 13, the at least one non-transitory computer-readable memory storing further instructions that, when executed by the at least one processor, are further effective to program the at least one processor to:
  receive, from a third speech processing component, second data identifying second source data used to generate second feature data;
  generate, by the second speech processing component of the speech processing system, the second source data during processing of the first input data;
  determine that the third speech processing component processes the first input data prior to the second speech processing component processing the first input data; and
  generate the second feature data using the second source data prior to generating the first feature data using the source data.

20. The computing device of claim 13, the at least one non-transitory computer-readable memory storing further instructions that, when executed by the at least one processor, are further effective to program the at least one processor to:
  receive a second request to process a second input data;
  generate, by the second speech processing component of the speech processing system, second source data during processing of the second input data;
  generate second feature data using the second source data;
  send the second feature data to the first speech processing component; and
  overwrite, by the first speech processing component, the first feature data in the first cache with the second feature data.

* * * * *